(12) United States Patent
Bae

(10) Patent No.: US 6,362,264 B1
(45) Date of Patent: Mar. 26, 2002

(54) STABILIZER FOR FOOD CONTACT AND MEDICAL GRADE PVC

(75) Inventor: Kook Jin Bae, Kinnelon, NJ (US)

(73) Assignee: CK Witco Corporation, Middlebury, CT (US)

( * ) Notice: Subject to any disclaimer, the term of this patent is extended or adjusted under 35 U.S.C. 154(b) by 670 days.

(21) Appl. No.: 08/772,351

(22) Filed: Dec. 20, 1996

(51) Int. Cl.⁷ ................................. C08K 5/36
(52) U.S. Cl. ..................... 524/302; 524/303; 524/304; 524/399
(58) Field of Search ................. 524/399, 303, 524/302, 304, 351, 114, 109, 567, 180

(56) References Cited

U.S. PATENT DOCUMENTS

| | | | | |
|---|---|---|---|---|
| 3,248,351 A | * | 4/1966 | Ray ........................... | 524/399 |
| 3,262,896 A | * | 7/1966 | Ackerman .................. | 524/399 |
| 3,322,705 A | * | 5/1967 | Kauder et al. .............. | 524/304 |
| 3,413,262 A | * | 11/1968 | Hecker et al. ............. | 524/303 |
| 3,479,309 A | * | 11/1969 | Hecker et al. ............. | 524/304 |
| 3,575,905 A | * | 4/1971 | Rhodes ....................... | 524/114 |
| 3,586,514 A | * | 6/1971 | Vijlbrief ..................... | 524/303 |
| 3,652,495 A | * | 3/1972 | Dean ........................... | 524/302 |
| 4,123,400 A | * | 10/1978 | Gay ............................. | 524/114 |
| 4,221,700 A | * | 9/1980 | Minigawa et al. .......... | 524/128 |
| 4,340,514 A | | 7/1982 | Housel | |
| 4,348,494 A | * | 9/1982 | Kheidr et al. ............... | 524/109 |
| 4,374,945 A | * | 2/1983 | Liauw et al. ................ | 524/114 |

FOREIGN PATENT DOCUMENTS

| | | | |
|---|---|---|---|
| FR | 2349620 | | 11/1977 |
| GB | 932253 | | 7/1963 |
| GB | 1001344 | * | 8/1965 |
| GB | 2212808 | * | 8/1989 |
| JP | 53-77238 | * | 7/1978 |

OTHER PUBLICATIONS

Christian Stapfer and Joel D. Granick: "Antioxidative Stabilization of Polyvinyl Chloride"—American Chemical Society, Div. Polymer Chemistry, Polymer Preprints, vol. 12, No. 1, Mar. 1971.*

Jerzy Wypych: Journal of Applied Polymer Science, vol. 23, 39–54, 1979.*

Protivová et al., Antioxidants and Stabilizers, Journal of Polymer Science, Polymer Symposia, No. 40 (1973), pp. 233–243.

Masaru, Vinyl Chloride Resin Composition Containing Diene Polymer, Patent Abstracts of Japan Publication No. 04359948, published Dec. 14, 1992.

Glushkova et al., Copolymer of Vinylidene Chloride and Vinyl Chloride, Derwent Abstract No. 94–270580, published Feb. 15, 1994.

* cited by examiner

*Primary Examiner*—Veronica P. Hoke
(74) *Attorney, Agent, or Firm*—Daniel Reitenbach

(57) ABSTRACT

Disclosed is a composition of matter which provides heat and color stability to polyvinyl chloride resins, especially of the flexible type, said composition consists essentially of (A) about 10 to about 40 parts by weight of a zinc carboxylate; (B) about 50 to about 80 parts by weight of an alkyl ester of thiodipropionic acid; and (C) abqut 5 to about 20 parts by weight of a phenolic antioxidant. A PVC resin containing the above composition of matter is also disclosed.

29 Claims, No Drawings

STABILIZER FOR FOOD CONTACT AND MEDICAL GRADE PVC

BACKGROUND OF THE INVENTION

The present invention relates to a composition useful for stabilizing polyvinyl chloride (PVC), especially flexible PVC formulated for food contact and medical uses. The resultant polyvinyl chloride polymers have enhanced resistance to deterioration in initial color, heat stability and clarity.

DISCUSSION OF PRIOR ART

The problem of imparting heat stability to polyvinyl chloride (PVC) at temperatures whereat the polymer becomes sufficiently fluid or softened to permit shaping is of long standing. At typical processing temperatures, PVC resins can degrade, liberating unwanted hydrogen chloride: such degraded resins can also become discolored and brittle; oftentimes they stick to the processing equipment. Degradation is commonly overcome by combining the PVC polymer, either before heating or during heat processing, with one or more heat stabilizers.

Among the more important PVC heat stabilizers in use in industry are mild alkalis such as: sodium carbonate, disodium phosphate, and sodium and potassium salts of partially esterified phosphoric acids; carboxylates and phenolates of zinc, cadmium, or alkaline earth metals have also been tried, as have inorganic and organic lead salts; other stabilizers include organotin carboxylates, as disclosed in U.S. Pat. No. 2,307,157 to Quattlebaum, and organotin mercaptides as disclosed in U.S. Pat. No. 2,641,588 to Leistner. Various metal-free organic compounds such as the polyols, e.g. mannitol, sorbitol, glycerol and pentaerythritol, organic phosphites, 1,2-epoxides, e.g. soy bean oil epoxide, isooctyl epoxystearate and the diglycidyl ether of 2,2-bis(p-hydroxyphenyl) propane, and nitrogen compounds such as phenylurea, N,N'-diphenylthiourea, and 2-phenylindole have been essayed as well.

In addition to utilizing individual stabilizers, compositions employing such materials as components have also been used. For example, U.S. Pat. No. 4,134,868 to Minagawa et al. discloses a PVC stabilizer composition comprising (A) a metal salt of a non-nitrogenous monocarboxylic acid or hydrocarbon-substituted phenol and (B) an aromatic carboxylic acid ester of a polyhydric alcohol having at least two alcoholic hydroxyls groups in its structure. This stabilizer when used alone is said to be effective in improving initial color and heat stability to the PVC resins. Further enhancement of these properties reportedly can be obtained by adding additional stabilizers such as phenols, aliphatic polyhydroxy compounds, organic phosphities, 1,2-epoxide compounds, amides and the like to the above PVC stabilizer composition.

Still another stabilizer composition for PVC resins is disclosed, for example, in U.S. Pat. No. 4,224,218 to Minagawa et al. Specifically, the '218 patent provides a PVC stabilizer composition which comprises (A) a metal salt of a sulfur- and nitrogen-free monocarboxylic acid or a phenol; and (B) a metal salt of phosphorous acid mono-ester in which the molar ratio of phosphorous acid mono-ester to metal is 1:1. Other stabilizers, such as phenols, aliphatic polyhydroxy compounds, organic phosphities, 1,2-epoxide compounds, amides and the like can also be used in conjunction with the stabilizer composition disclosed in the '218 patent to reportedly improve the overall effectiveness of the stabilizer.

A similar stabilizer composition is disclosed in U.S. Pat. No. 4,224,203 to Minagawa et al. Specifically, the stabilizer composition disclosed in the '202 patent comprises (A) a metal salt of a sulfur- and nitrogen-free monocarboxylic acid or a phenol; and (B) a metal P-hydrocarbonphosphonate having at least 1 to 30 carbon atoms in the hydrocarbon group. Such a stabilizer composition when used alone is reported to be effective in imparting improved heat resistance as well as preventing discoloration. Further enhancement of these properties is reportedly obtained by adding additional stabilizers to the stabilizer composition disclosed in the '203 patent.

U.S. Pat. No. 4,252,698 to Ito et al. provides an anti-yellowing additive for PVC resins which includes at least one overbased sulfonate or phenolate compound of lithium, sodium, potassium, magnesium, calcium, strontium, barium, zinc, titanium, aluminum, zirconium, or tin and a 1,3-diketone compound having 5 to 30 carbon atoms. Other stabilizers such as described in the '898, '218 and '203 patents may also be employed with the stabilizer composition disclosed in the '698 patent to improve the overall effectiveness of the final stabilizer composition.

Among the more common PVC stabilizers currently used are those that contain tris(nonylphenyl)phosphite, as well as other compounds related to nonylphenol. These materials have found especial utility in providing stability to flexible PVC resins. Flexible PVC resins are used in food contact environments such as packaging films and closures for bottles and jars and for medical products such as packaging for drugs and medicines, medical tubing as well as other body contact items. However, recent concerns over possible estrogenic effects attributed to stabilizers comprising nonylphenyls and related compounds has made the continued use of such stabilizers problematic.

Hence, there remains a need for developing new PVC stabilizers for use with flexible PvC resins that are used in food contact and medical contact applications which impart high heat stability and prevent discoloration of the initial PVC resin.

SUMMARY OF THE INVENTION

The present invention satisfies the aforementioned objectives and affords the other advantages described hereinbelow.

One aspect of the present invention relates to a stabilizer composition which has a low toxicity, and is capable of being used with food contact and medical contact flexible PVC polymers. Specifically, the stabilizer composition of the present invention consists essentially of (A) about 10 to about 40 parts by weight of a zinc carboxylate having the formula $(RCO_2)_2Zn$, wherein R is an aliphatic, cycloaliphatic or aromatic hydrocarbon containing from about 6 to about 22 carbon atoms; (B) about 40 to about 80 parts by weight of an alkyl ester of thiodipropionic acid having the formula $S(CH_2CH_2CO_2R^1)_2$ wherein $R_1$ is a straight chain or branched alkyl having from about 6 to about 22 carbon atoms; and (C) about 5 to about 20 parts by weight of a phenolic antioxidant such as 2,6-di-t-butyl-4-methylphenol (BHT).

The above stabilizer composition may be used alone or, optionally, with other additives well known to those skilled in the art such as epoxide compounds, inorganic stabilizers and polyhydric alcohols, i.e., polyols. It should be emphasized that these optional additives must also be low in toxicity and acceptable for food contact and medical uses. Those additives which are too toxic for such uses are excluded from the stabilizer composition of the present invention. Moreover, phosphite stabilizers such as tris (nonylphenyl)phosphite and calcium fatty acid salts such as calcium stearate are also excluded from the stabilizer composition of the present invention.

The preferred stabilizer composition of the instant invention contains FDA regulated materials and the most preferred stabilizer consists essentially of about 20 parts by weight zinc stearate; about 70 parts by weight dilaurylthiodipropionate (DLTDP); and about 10 parts by weight of BHT.

In another aspect, the present invention is directed to flexible polyvinyl chloride formulations stabilized against heat and discoloration comprising a flexible polyvinyl chloride polymer and an effective amount of the stabilizer composition of the present invention. Since the stabilizer composition of the present invention is low in toxicity, the stabilized flexible PVC resins of the present invention are highly useful as food contact products or components of medical devices.

DESCRIPTION OF THE INVENTION

As stated hereinabove, one aspect of the present invention relates to a stabilizer composition which is useful for imparting heat stability and prevent discoloration of PVC resins of the flexible type. Moreover, since each of the components of the stabilizer composition of the present invention is low in toxicity, the final stabilizer composition is also low in toxicity and can be used in food contact applications as well as in medical contact applications.

In accordance with the present invention, the stabilizer composition of the present invention comprises a zinc carboxylate; an alkyl ester of thiodipropionic acid; and a phenolic antioxidant.

The zinc carboxylates that can be employed in the present invention have the following formula:

$(RCO_2)_2Zn$ wherein R is an aliphatic, cycloaliphatic or aromatic hydrocarbon containing from about 6 up to about 22 carbon atoms. The term "aliphatic hydrocarbon" as used herein denotes an alkane or alkene having from about 6 to about 22, preferably about 12 to about 18, carbon atoms which may be linear or branched. Suitable zinc carboxylates that may be employed in the present invention, include, but are not limited, zinc benzoate, zinc palmitate, zinc resinate, zinc stearate, zinc oleate, zinc myristate, zinc linolate and the like. Mixtures of these zinc carboxylates are also contemplated herein. A highly preferred zinc carboxylate employed in the present invention is zinc stearate.

In a preferred embodiment of the present invention, FDA regulated zinc carboxylates are employed. The term "FDA regulated" is used herein to denote materials that have a low toxicity and which meet the guidelines set forth by the FDA as described in Title 21 Part 178 of the Code of Federal Regulations for food contact applications. By "low toxicity", it is meant any material which is suitable for use in food and/or medical contact application.

Of the zinc carboxylates mentioned hereinabove, the following zinc carboxylates are presently regulated by the FDA for use in food contact applications: zinc benzoate, zinc palmitate, zinc resinate and zinc stearate. Mixtures containing one or more of these FDA regulated zinc carboxylates are also within the scope of the present invention. Of the FDA regulated zinc carboxylates mentioned hereinabove, zinc stearate is highly preferred in the present invention.

The amount of zinc carboxylate employed in the stabilizer composition of the present invention is generally from about 10 to about 40 parts by weight. More preferably, the stabilizer composition of the instant invention contains about 20 parts by weight of zinc carboxylate.

Any grade of zinc carboxylate satisfactory for food contact applications may be employed in the present invention. For example, when zinc stearate is employed, a high purity grade powder or flake, a normal commercial grade powder or flake, or a Kosher grade powder or flake may be used.

The second component of the stabilizer composition of the instant invention is an alkyl ester of thiodipropionic acid having the formula $S(CH_2CH_2CO_2R^1)$ wherein $R^1$ is an alkyl, which can be linear or branched, having from about 6 up to about 22 carbon atoms. Suitable thiodipropionates include, but are not limited to, dicetyl 3,3'-thiodipropionate, dilauryl 3,3'-thiodipropionate, dimyristyl 3,3'-thiodipropionate, dioleyl 3,3'-thiodipropionate, didecyl 3,3'-thiodipropionate, lauryl stearyl 3,3'-thiodipropionate and the like. Mixtures of these dithiopropionates are also contemplated in the present invention. Of these dithiopropionates, dilauryl 3,3'thiodiproponiate (DLTDP) is most highly preferred.

In a preferred embodiment of the present invention, FDA regulated alkyl esters of thiodipropionic acids are employed. Of the alkyl esters of thiodipropionic acids mentioned hereinabove, the following are currently regulated by the FDA for use in food contact applications: dicetyl 3,3'-thiodipropionate, dilauryl 3,3'-thiodipropionate, dimyristyl 3,3'-thiodipropionate. Mixtures of these FDA regulated compounds are also contemplated herein. Of these FDA regulated compounds, dilauryl 3,3'-thiodipropionate (DLTDP) is highly preferred in the present invention.

The second component of the stabilizer composition of the present invention, i.e. the alkyl ester of thiodipropionic acid, is generally present in the final composition in an amount of from about 40 to about 80 parts by weight. More preferably, the thiodipropionic acid component employed in the present invention is present in an amount of about 70 parts by weight. Any grade of this second component of the stabilizer composition of the present application satisfactory for food contact applications may be employed in the present invention.

The third component of the stabilizer composition of the present invention is a phenolic antioxidant. Any of the phenolic antioxidants which are low in toxicity and known to those skilled in the art can be employed in the present invention. The phenolic antioxidants typically contain one or more phenolic hydroxyl groups and one or more phenolic nuclei and contain from about 8 to about 75 carbon atoms. Thus, monocyclic as well as polycyclic phenols are contemplated in the present invention. Suitable phenolic antioxidants that may be employed in the present invention include, but are not limited to, 4,4'-isopropylidenediphenol, 1,1,3-tris(2'methyl-4'-hydroxy-5'-t-butylphenyl)butane, 2,2'-ethylidene bis(4,6-di-t-butyl)phenol, 2,6-di-t-butyl-4-methylphenol(BHT), and 1,1,3-tris-(1-methyl-3-hydroxy-4-t-butylphenyl)butane, 2,2'-methylenebis-4(octylphenol), 2-ethylbutylene-4,4'-bisphenol, octadecyl 3,5-di-t-butyl-4-hydroxyphenylproponate, 1,3,5-tris(3,5-di-t-butyl-4-hydroxylbenzyl) isocyanurate and pentaerythritol tetrakes (3,5-di-t-butyl-4-hydroxyphenylpropionate. Of the phenolic antioxidants listed hereinabove, BHT is highly preferred in the present invention.

The preferred phenolic antioxidants employed in the present invention are FDA regulated phenolic compounds which are selected from the group consisting of 4,4'- isopropylidenediphenol, 1,1,3-tris(2'methyl-4'-hydroxy-5't-butylphenyl)butane, 2,2'-ethylidene bis(4,6-di-t-butyl) phenol and 2,6-di-t-butyl-4-methylphenol(BHT). A highly preferred FDA regulated phenolic antioxidant employed in the present invention is BHT.

The third component of the stabilizer composition of the present invention, i.e. the phenolic antioxidant, is generally present in the final composition in an amount of from about 5 to about 20 parts by weight. More preferably, the phenolic antioxidant component employed in the present invention is present in an amount of about 10 parts by weight.

The most preferred stabilizer composition of the present invention contains only FDA regulated material and consists essentially of about 20 parts by weight zinc stearate; about 70 parts by weight DLTDP; and about 10 parts by weight BHT.

The stabilizer composition of the present invention may be prepared using techniques well known to those skilled in the art. For example, the stabilizer composition of the present invention may be prepared by mechanically mixing the three components of the stabilizer composition, as by sifting or tumbling; or, alternatively, by melting the ingredients together and flaking or grinding the resolidified melt.

The stabilizer composition of the present invention is preferably used in combination with a flexible polyvinyl chloride composition. The term "polyvinyl chloride" as used herein is inclusive of any polymer formed at least in part of the repeating unit (—CHCl—CX$_2$—)$_p$ and having a chlorine content in excess of 40%. In this formula, each of the X groups can be either hydrogen or chlorine, and p is the number of repeating units in each polymer chain. In PVC homopolymers, each of the X groups are hydrogen. Thus, the terms "PVC" and "polyvinyl chloride" include not only polyvinyl chloride homopolymers but also after-chlorinated polyvinyl chlorides, as well as copolymers of vinyl chloride and vinyl acetate, copolymers of vinyl chloride with maleic or fumaric acids or esters, and copolymers of vinyl chloride with gtyrene. The stabilizer composition is effective also with mixtures of polyvinyl chloride in major proportion with a minor proportion of other synthetic resins such as chlorinated polyethylene or copolymers of acrylonitrile, butylene and styrene.

In addition to including a PVC polymer, the flexible PVC compositions of the present invention also comprise a flexible comonomer such as vinyl acetate and/or a plasticizer. Typical plasticizers which may be present in the flexible PVC composition include, but are not limited to, low volatility esters such as phosphates and polycarboxylates having from about 18 to about 36 carbon atoms. Examples of suitable plasticizers include, but are not limited to, 2-ethylhexyl diphenyl phosphate, dibutyl sebacate, di-2-ethylhexyl phthalate, diisononyl adipate, di-ethylhexyl adipate and tri(2-ethylhexyl)trimellitate.

Flexible PVC compositions used in the present invention are prepared using techniques well known to those skilled in the art. Such flexible PVC compositions are distinguishable from so-called "rigid" PVC polymers which are typically used in structural applications such as piping, window frames and house siding. The flexible PVC compositions may be prepared by copolymerizing a vinyl chloride with a vinyl acetate in sufficient proportion, such as 85:15 vinyl chloride:vinyl acetate. Additionally, the flexible PVC compositions may be prepared by blending a vinyl chloride homopolymer or an inherently rigid copolymer with one of the aforementioned plastizers and/or flexible blending polymers such as ethylene-vinyl acetate copolymer.

The stabilizer composition of the present invention is used in small amounts effective to impart improved heat stability and to prevent discoloration of the flexible PVC resin. Effective results can be afforded generally by adding about 0.4 to about 1.5 phr (parts by weight per hundred parts by weight of the PVC) of the stabilizer composition of the present invention. Preferred amounts are generally in the range of from about 0.6 to about 0.7 phr. The stabilizer composition of the present invention can be compounded into the resin formulation in accordance with conventional compounding techniques.

The stabilizer composition of the present invention is effective in improving initial color and heat stability of the PVC resins in the absence of any other additive. However, further enhancement of these properties may be obtained if one or more, optional additional stabilizers such as inorganic stabilizers, polyhydric alcohols or epoxy compounds are used in conjunction with the stabilizer composition of the present invention. These additional stabilizers must also be low in toxicity and preferably should be regulated by the FDA for use in food contact applications.

When employed, the additional stabilizers can be added either before or during the compounding process. Typically, these additional stabilizers are added in relative minor quantities which do not effect the results achieved by the stabilizer composition of the present invention. Epoxide stabilizers are usually employed in the present invention in higher levels than the inorganic or polyhydric alcohols. Generally, the additional inorganic or polyhydric alcohol stabilizers are present in an amount of from about 0.01 to about 5 phr. More preferably, the additional additives are present in an amount of from about 0.1 to about 0.5 phr. Additional epoxide stabilizers are typically employed in an amount of from about 0.5 to about 25, more preferably from about 1 to about 15 phr.

Typical inorganic additives that can be employed in the present invention include silicates, zeolites, hydrotalcites, titanium dioxide, aluminum oxide, magnesium oxide, calcium carbonate, calcium hydroxide and the like.

Suitable epoxy compounds which may be employed in the present invention include, but are not limited to, epoxide triglyceride oils such as epoxy soybean oil, epoxylinseed oil, epoxidized fish oils and epoxidized tallows; epoxidized esters such as methyl, isobutyl, and 2-ethylhexylepoxystearates, epoxidized butyl and isooctyl esters of tall oil fatty acids, and 3,4-epoxycyclohexanemethyl, 3,4-epoxycyclohexanecarboxylate; epoxidized hydrocarbons such as epoxide polybutadiene and 1,2,5-tris(epoxyethyl) benzene; and epoxide ethers such as 1,2,3-tris(2',3'-epoxypropoxy)propane and 4,4'-isopropylidenebis(phenyl glycidyl) ether.

The polyhydric alcohols employed in the present invention are polyols which comprise one or more polyol compound containing 2 to 10 hydroxyl groups and they contain generally 2 to 20 carbon atoms. Examples of suitable polyol compounds include, ethylene glycol, propylene glycol, glyercol, sorbitol, mannitol, xylitol, pentaerythritol, dipentaerythritol and trilpentaerythritol.

The following examples are given to illustrate the scope of the present invention. Because these examples are given for illustrative purposes only, the invention embodied therein should not be limited thereto.

EXAMPLE I

In this example, the heat stability of a flexible PVC resin formulation containing a stabilizer composition of the present invention at various temperatures was compared with a flexible PVC resin containing a conventional stabilizer at the same temperatures. The heat stability of various individual components of the stabilizer composition of the present invention was also investigated.

Specifically, the stabilizer compositions described in Table 1 hereinbelow were prepared and then each stabilizer in the amount indicated in the table was compounded at 350° F. (176° C.) for 5 minutes to a PVC formulation which comprises the following components:

| COMPONENT: | AMOUNT (Parts by Weight) |
| --- | --- |
| PVC resin: | 100.0 |
| di-ethylhexyl adipate: | 16.0 |
| Epoxy Soybean oil | 10.0 |
| N-42 (antifogging agent: ethoxylated-nonylphenol) | 4.0 |
| Wax E (1,3 butanediol ester of montan wax acids): | 0.2 |

It is noted that stabilizer B represents the stabilizer of the present invention whereas the remaining stabilizers represent a composition which is outside the scope of the present invention. Oven stability tests of each of the samples were conducted at 350° F. (176° C.) and at 375° F. (190° C.).

The following results were obtained from the aforementioned oven stability tests. In the case of the test made at 350° F., the stabilizer composition of the present invention imparted long term heat stability to the PVC resin while maintaining good initial color hold up to 120 minutes. In contrast thereto, the conventional stabilizer A that is currently employed in the prior art did not exhibit a long term heat stability compared with the stabilizer of the present invention. Moreover, the conventional stabilizer was less effective in maintaining the initial color hold of the PVC resin than the stabilizer of the present invention. These superior results show that the stabilizer composition of the present invention is a viable replacement for the conventional stabilizer that is currently being employed. In regard to the remaining samples, namely samples C–J, those samples also did not exhibit long term heat stability and/or initial color hold. Instead, their heat stability was significantly less than that obtained using the stabilizer composition of the present invention. This result illustrates the synergetic effects which are observed using all three components of the present invention compared to compositions which do not contain all three of the components of the present invention.

With respect to the tests made at 375° F., the stabilizer composition of the present exhibited good initial color hold and long term stability which was significantly better than the conventional stabilizer, Sample A, currently being employed. The remaining samples also exhibited significantly less initial color hold and long term stability compared with the PVC reins stabilized by the stabilizer composition of the present invention.

While the invention has been particularly shown and described with respect to preferred embodiments thereof, it will be understood by those skilled in the art that the foregoing and other changes in form and detail may be made without departing from the spirit and scope of the invention.

TABLE 1

| Stabilizer | Parts by Weight-ingredients | Amount stabilizer employed (phr) |
| --- | --- | --- |
| A (prior art) | 0.2 Zn Stearate & 1.0 tris (nonylphenyl) phosphite | 1.2 |
| B (invention) | 20.0 Zn Stearate 70.0 DLTDP, & 10.0 BHT | 1.0 |
| C (comparative) | 0.67 DLTDP & 0.33 Zn Stearate | 1.0 |
| D (comparative) | 0.33 DLTDP & 0.67 Zn Stearate | 1.0 |
| E (comparative) | 0.67 DLTDP & 0.33 Zn Stearate | 1.0 |
| F (comparative) | 0.67 Zn Stearate & 0.33 BHT | 1.0 |
| G (comparative) | 0.2 Zn Stearate | 0.2 |
| H (comparative) | 1.0 Zn Stearate | 1.0 |
| I (comparative) | 1.0 DLTDP | 1.0 |
| J (comparative) | 1.0 BHT | 1.0 |

What is claimed is:

1. A composition of matter comprising:
   (i) food contact or medical contact polyvinyl chloride resin; and
   (ii) a low toxicity stabilizer suitable for use with food contact and medical applications, for providing heat stability to the polyvinyl chloride resin, wherein the stabilizer consists essentially of: (a) about 10 to about 40 parts by weight of a zinc carboxylate having the formula $(RCO_2)_2Zn$, wherein R is an aliphatic, cycloaliphatic or aromatic hydrocarbon containing from about 6 to about 22 carbon atoms; (b) about 40 to about 80 parts by weight of an alkyl ester of thiodipropionic acid having the formula $S(CH_2CH_2CO_2R^1)_2$ wherein $R^1$ is an alkyl having from about 6 to about 22 carbon atoms; and (c) about 5 to about 20 parts by weight of a phenolic antioxidant,
   the composition of matter being essentially free of calcium fatty acid salts.

2. The composition of matter according to claim 1 wherein the zinc carboxylate is selected from the group consisting of zinc benzoate, zinc palmitate, zinc resinate, zinc stearate, zinc oleate, zinc myristate, zinc linolate and mixtures thereof.

3. The composition of matter of claim 2 wherein the zinc carboxylate is selected from the group consisting of zinc benzoate, zinc palmitate, zinc resinate, zinc stearate and mixtures thereof.

4. The composition of matter of claim 3 wherein the zinc carboxylate is zinc stearate.

5. The composition of matter of claim 4 wherein the zinc carboxylate is present in an amount of about 20 parts by weight.

6. The composition of matter of claim 1 wherein the alkyl ester of thiodipropionic acid is selected from the group consisting of dicetyl 3,3'-thiodpropionate, dilauryl 3,3'-thiodipropionate, dimyristyl 3,3'-thiodipropionate, dioleyl 3,3'-thiodipropionate, didecyl 3,3'-thiodipropionate, lauryl stearyl 3,3'-thiodipropionate and mixtures thereof.

7. The composition of matter of claim 6 wherein the alkyl ester of thiodipropionic acid is selected from the group consisting of dicetyl 3,3'-thiodipropionate, dilauryl 3,3'-thiodipropionate, dimyristyl 3,3'-thiodipropionate, and mixtures thereof.

8. The composition of matter of claim 7 wherein the alkyl ester of thiodipropionic acid is dilauryl 3,3'-thiodipropionate.

9. The composition of matter of claim 8 wherein the alkyl ester of thiodipropionic acid is present in an amount of about 70 parts by weight.

10. The composition of matter of claim 1 wherein the phenolic antioxidant is selected from the group consisting of 4,4'-isopropylidenediphenol, 1,1,3-tris(2'methyl-4'-hydroxy-5'-t-butylphenyl)butane, 2,2'-ethylidene bis(4,6-di-t-butyl)phenol, 2,6-di-t-butyl-4-methylphenol(BHT), and 1,1,3-tris-(1-methyl-3-hydroxy-4-t-butylpheyl)butane, 2,2'-methylenebis-4(octylphenol), 2-ethylbutylene-4,4'-bisphenol, octadecyl 3,5-di-t-butyl-4-hydroxyphenylpropionate, 1,3,5-tris(3,5-di-t-butyl-4-hydroxylbenzyl) isocyanurate, pentaerythritol tetrakis(3,5-di-t-butyl-4-hydroxyphenylpropionate) and mixtures thereof.

11. The composition of matter of claim 10 wherein the phenolic antioxidant is selected from the group consisting of 4,4'-isopropylidenediphenol, 1,1,3-tris(2'methyl-4'-hydroxy-5't-butylphenyl)butane, 2,2'-ethylidene bis(4,6-di-t-butyl)phenol, 2,6-di-t-butyl-4-methylphenol(BHT) and mixtures thereof.

12. The composition of matter of claim 11 wherein the phenolic antioxidant is 2,6-di-t-buty-4-methylphenol (BHT).

13. The composition of matter of claim 12 wherein the phenolic antioxidant is present in an amount of about 10 parts by weight.

14. The composition of matter of claim 1 wherein the polyvinyl chloride resins is a flexible polyvinyl chloride composition.

15. The composition of matter of claim 1 further including one or more additional low toxicity stabilizers selected from the group consisting of inorganic stabilizers, polyhydric alcohols and epoxy compounds.

16. The composition of matter of claim 15 wherein said additional low toxicity stabilizer is an inorganic or polyhydric alcohol and is present in an amount of from about 0.01 to about 5 phr.

17. The composition of matter of claim 16 wherein the additional low toxicity stabilizer is present in an amount of from about 0.1 to about 0.5 phr.

18. The composition of claim 15 wherein the low toxicity stabilizer is an epoxide stabilizers and is present in an amount of from about 0.5 to about 25 phr.

19. The composition of claim 1 wherein the epoxide stabilizer is present in an amount of from about 1 to about 15 phr.

20. The composition of matter of claim 15 wherein the inorganic stabilizer is selected from the group consisting of silicates, zeolites, titanium dioxide, aluminum oxide, magnesium oxide, calcium carbonate and calcium hydroxide.

21. The composition of matter of claim 15 wherein the epoxy compounds are selected from the group consisting of epoxide triglyceride oils, epoxidized esters, epoxidized hydrocarbons and epoxidized ethers.

22. The composition of matter of claim 15 wherein the polyhydric alcohols are polyols selected from the group consisting of ethylene glycol, propylene glycol, glycerol, sorbitol, mannitol, xylitol, pentaerythritol, dipentaerythritol and tripentaerythritol.

23. A flexible polyvinyl resin composition which comprises: a polyvinyl chloride resin, a flexible comonomer and/or plasticizer, and a heat stabilizing effective amount of a low toxicity stabilizer suitable for use with food contact and medical applications, wherein the stabilizer consists essentially of: (a) about 10 to about 40 parts by weight of a zinc carboxylate having the formula $(RCO_2)_2Zn$, wherein R is an aliphatic, cycloaliphatic or aromatic hydrocarbon containing from about 6 to about 22 carbon atoms; (b) about 40 to about 80 parts by weight of an alkyl ester of thiodipropionic acid having the formula $S(CH_2CH_2CO_2R^1)_2$ wherein $R^1$ is an alkyl having from about 6 to about 22 carbon atoms; and (c) about 5 to about 20 parts by weight of a phenolic antioxidant, the flexible polyvinyl resin composition being essentially free of calcium fatty acid salts.

24. The flexible polyvinyl resin composition of claim 23 wherein from about 0.4 to about 1.5 phr of said stabilizer is added to 100 parts of said polyvinyl chloride resin.

25. The flexible polyvinyl resin composition of claim 24 wherein about 0.6 to about 0.7 phr of said stabilizer is added to said polyvinyl chloride resin.

26. The flexible polyvinyl resin composition of claim 23 wherein said zinc carboxylate is zinc stearate, said alkyl ester of thiodipropionic acid is dilauryl 3,3'-thiodipropionate and said phenolic antioxidant is 2,6-di-t-butyl-4-methylphenol (BHT).

27. The flexible polyvinyl resin composition of claim 23 further including one or more additional low toxicity stabilizers selected from the group consisting of inorganic stabilizers, polyhydric alcohols and epoxy compounds.

28. A composition of matter comprising:
(i) a food contact or medical contact polyvinyl chloride resin; and
(ii) a low toxicity stabilizer suitable for use with food contact and medical applications, for providing heat stability to the polyvinyl chloride resin, wherein the stabilizer consists essentially of: about 20 parts by weight of zinc stearate, about 70 parts by weight of dilauryl 3,3'-thiodipropionate, and about 10 parts by weight of 2,6-di-tert-butyl-4-methylphenol (BHT), the composition of matter being essentially free of calcium fatty acid salts.

29. A flexible polyvinyl resin composition which comprises: a polyvinyl chloride resin, a flexible comonomer and/or plasticizer, and a heat stabilizing effective amount of a low toxicity stabilizer suitable for use with food contact and medical applications, wherein the stabilizer consists essentially of: about 20 parts by weight of zinc stearate, about 70 parts by weight of dilauryl 3,3'-thiodipropionate; and about 10 parts by weight of 2,6-di-tert-butyl-4-methylphenol (BHT), the flexible polyvinyl resin composition essentially free of calcium fatty acid salts.

* * * * *